Feb. 27, 1951  H. M. STEARNS  2,543,072
AUTOMATIC RANGE GATE
Filed June 9, 1944  2 Sheets-Sheet 1
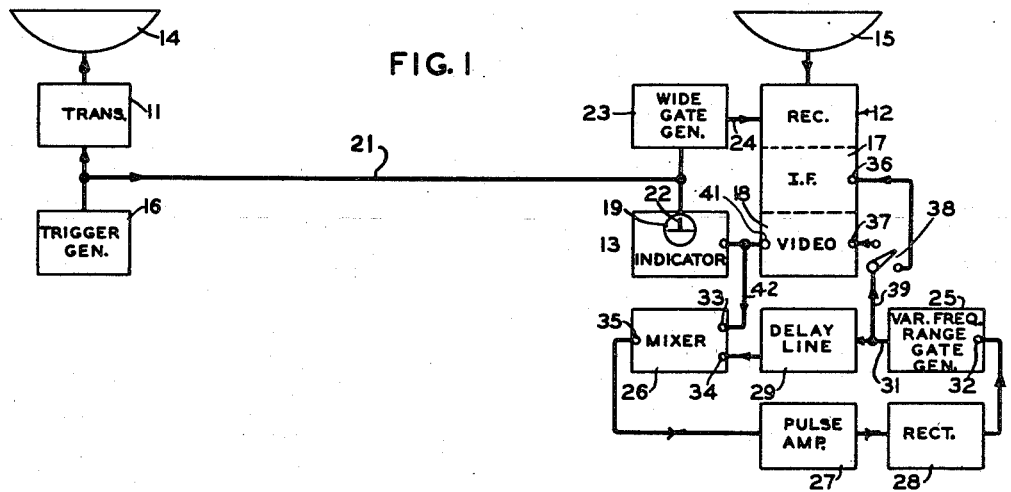
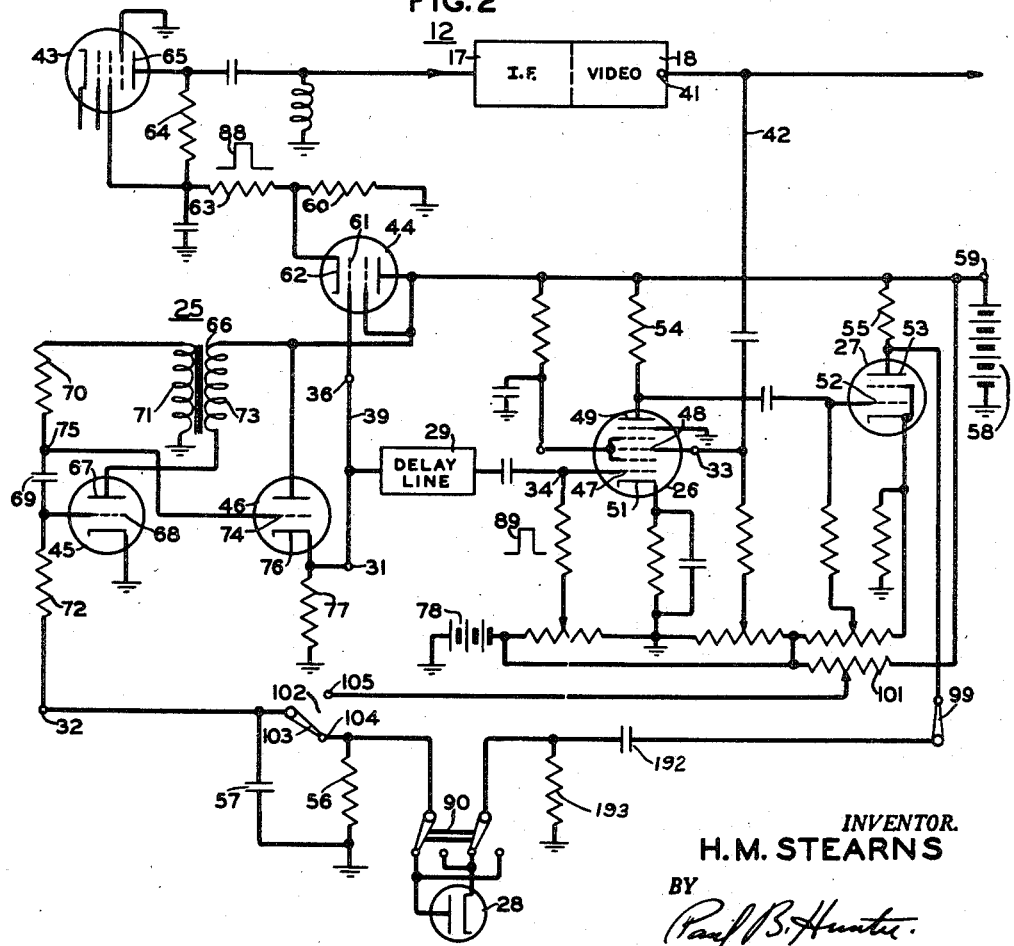
INVENTOR.
H. M. STEARNS
BY
ATTORNEY

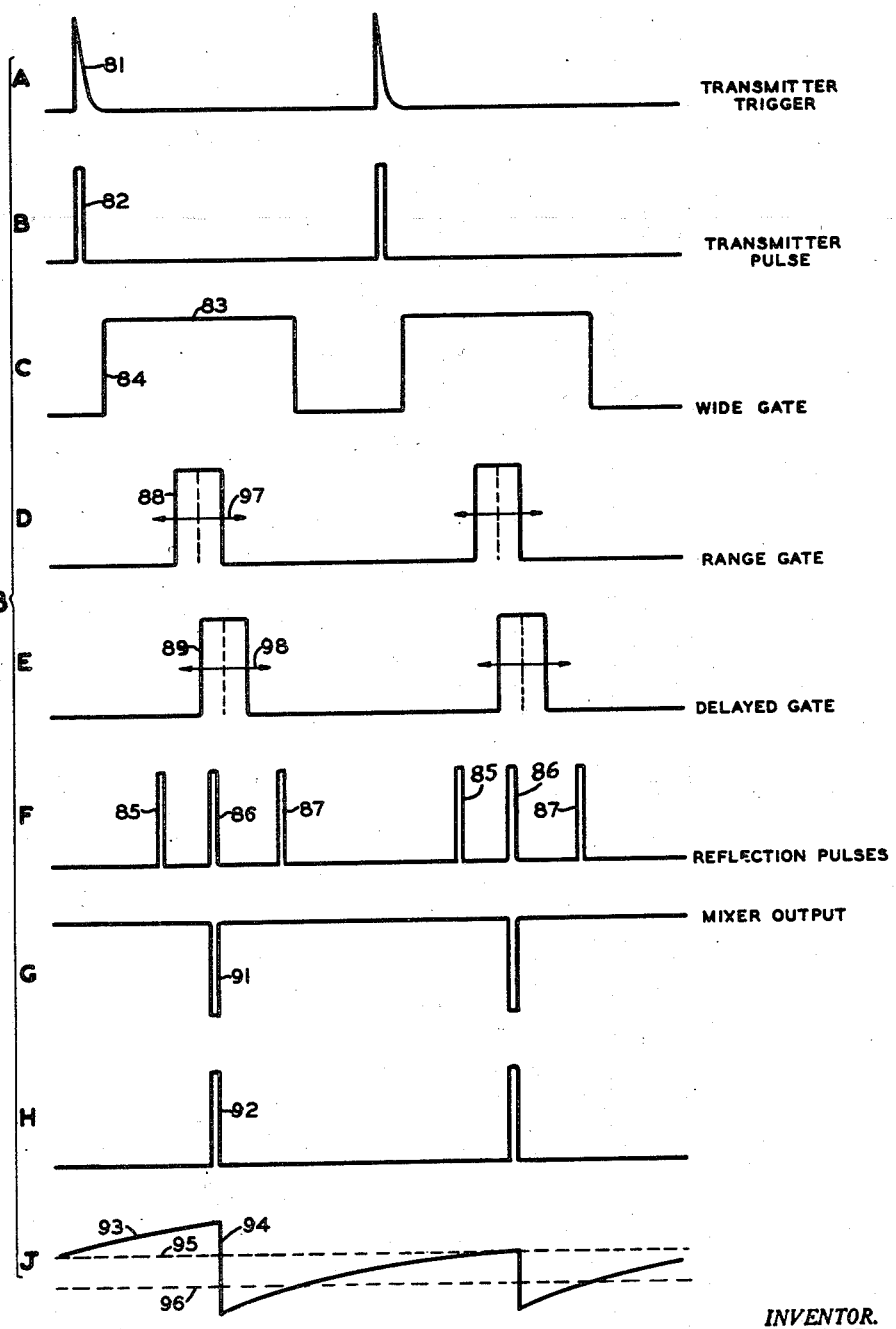

Patented Feb. 27, 1951

2,543,072

UNITED STATES PATENT OFFICE 2,543,072

AUTOMATIC RANGE GATE

Horace Myrl Stearns, Merrick, N. Y., assignor to The Sperry Corporation, a corporation of Delaware Application June 9, 1944, Serial No. 539,501

10 Claims. (Cl. 343—13)

My invention relates to object locating systems, and concerns particularly object detectors and locators of the radio type.

An object of my invention is to provide improved methods and apparatus for detecting objects by reflection of transmitted radio waves.

Another object of my invention is to provide improved methods and apparatus for determining the range or distance from a detected or wave-reflecting object.

Another object of the invention is to provide arrangements for locating an object in range and continuously tracking an object with respect to range.

Still another object of the invention is to provide an automatic range gate for radio reflection reecivers.

Another object of the invention is to provide methods and apparatus for "scanning" with respect to range, in order to locate an object which may be present.

Other and further objects, features and advantages will become apparent as the description proceeds.

My invention may be carried out in connection with radio object-detecting apparatus of the type which includes a pulse transmitter which is triggered by a trigger generator and a receiver which supplies signals to an indicator whenever a reflection is received. Such an indicator may be provided with a time sweep whereby the position of the indication produced in response to a reflection is indicative of the time lapse after a transmitted pulse before the reflection was received, and is therefore indicative of the range of the detected object which reflected the transmitted wave.

In carrying out my invention in its preferred form in connection with such radio object detecting apparatus, I provide a variable frequency range gate generator having a normal frequency different from the frequency of the transmitter trigger generator, for example, having greater frequency. The receiver is arranged to be gated, that is, made sensitive in response to a gating voltage from the range gate generator, and I provide a mixer which is jointly responsive to the receiver output and to the variable frequency range gate. The mixer is so arranged as to supply a frequency-varying voltage to the range gate generator whenever it is supplied with coinciding signals by the receiver and the range gate generator. In this manner, whenever the object is located in range so that the time of reception of the reflected wave coincides with the time of generation of the range gate, a voltage is supplied through the mixer to the range gate generator for adjusting its frequency to conform to that of the trigger generator.

A better understanding of the invention will be afforded by the following detailed description considered in conjunction with the accompanying drawing and those features of the invention which are believed to be novel and patentable will be pointed out in the claims appended hereto.

In the drawings,

Fig. 1 is a block diagram schematically representing a range indicating and tracking system in accordance with an embodiment of my invention;

Fig. 2 is a circuit diagram of the range gate system represented in Fig. 1, together with associated parts of a receiver with which it is used;

Fig. 3 is a series of graphs illustrating the principle of operation of the apparatus of Figs. 1 and 2 and showing voltage wave form plotted against time at various points in the apparatus.

Like reference characters are utilized throughout the drawings to designate like parts.

The object locating system illustrated in the drawings comprises a transmitter 11, a receiver 12, an indicator 13 responsive to the receiver 12, and radiators or antennae 14 and 15 for the transmitter 11 and the receiver 12, respectively. It will be understood that the same antenna can be employed for both the transmitter and receiver, but for convenience, separate antennae are shown. For pulsing the transmitter 11, that is, causing it to project trains of high frequency oscillations intermittently, a trigger generator 16 is provided which energizes the transmitter 11 at a repetition rate corresponding to the frequency of the trigger generator 16.

The receiver 12 may include a radio frequency stage followed by an intermediate-frequency stage 17 and a video stage 18. The indicator 13 may be of the cathode ray deflectible beam type, having a screen 19 and including a sweep wave generator, which may be synchronized through a coupling 21 by the trigger generator 16 for the purpose of sweeping the cathode ray beam across the screen 19 whenever a transmitter pulse is triggered by the trigger generator 16. The indicator 13 may either be so arranged that the output signal from the video stage controls beam brightness or so that it produces beam deflection transverse to the time sweep. For instance, the indicator 13 may have its beam deflected horizontally by the time sweep and vertically by the output of the video stage 18 so that a vertical trace 22 appears on the screen 19 whenever the receiver 12 receives a reflection, which produces a signal output through the video stage 18.

In order to prevent the receiver 12 from becoming sensitive until after the pulse from the transmitter 11 has been transmitted, a wide gate generator 23 may be provided which is also synchronized by the trigger generator 16. A sensitivity control connection represented by the channel 24 is shown between the wide gate generator 23 and the receiver 12.

The foregoing elements of the detector apparatus do not constitute a part of my present invention and have been described very briefly merely for the purpose of indicating the nature and principle of operation of the elements associated with my automatic range tracking system.

For causing the apparatus to search or scan in range and to track an object which has been located, additional elements are provided comprising a variable frequency range gate generator 25, a mixer 26, and preferably a pulse amplifier 27 and a rectifier 28. For reasons which are more apparent hereinafter, it is advantageous to provide also a delay line 29 interposed between the range gate generator 25 and the mixer 26. The range gate generator 25 has an output terminal 31 and a voltage-responsive frequency control terminal 32. The mixer 26 is provided with two input terminals 33 and 34 and an output terminal 35. The rectifier 28 is interposed between the mixer output terminal 35 and the frequency control terminal 32, if the mixer is not of the type which produces a unidirectional output, and the generator 25 is of the type in which a unidirectional voltage is utilized for controlling its frequency. As shown, the pulse amplifier 27 is interposed between the mixer output terminal 35 and the rectifier 28.

As is well known to those skilled in the art related to radio object locating systems, radio frequency receivers such as the receiver 12 may be gated or have their sensitivity controlled by controlling voltages applied at various plants, for example, anode power supply voltage or screen grid voltage, or voltage at some suitable point. A gating or sensitivity-control terminal supplying the controlling voltage to the apparatus may be in the initial stage of the receiver or in one of the other stages such as the intermediate frequency stage 17 or the video stage 18, or if desired a gating terminal may also be provided in the indicator 13. As represented schematically, alternative gating terminals 36 and 37 in the intermediate frequency stage 17 and the video stage 18, respectively, may be provided. A double throw switch 38 is represented for selecting whichever of these gating terminals is desired. A coupling or channel represented by the line 39 is provided between the output terminal 31 of the variable frequency range gate generator or receiver gater 25 and the selector switch 38, and the output terminal 31 is also coupled to the input terminal 34 of the mixer 26 through the delay line 29.

The video stage 18 has an output terminal 41 coupled to the indicator 13 and also coupled through means represented by a line 42 to the input terminal 33 of the mixer 26.

The invention is not limited to the use of the specific arrangement illustrated, nor to the use of specific types of elements. Nevertheless, for the sake of illustration, circuit arrangements and connections have been shown in Fig. 2 which may satisfactorily be employed for some of the schematically indicated elements of Fig. 1, such as the variable frequency range gate generator 25, the mixer 26 and various conventional elements.

As illustrated in the arrangement of Fig. 2, an amplifier 43, shown as being of the vacuum tube type, may be interposed in advance of the intermediate frequency stage 17. A gate amplifier 44, also shown as being of the vacuum tube type, may be provided for controlling the energization of the amplifier 43 and thereby gating the intermediate frequency stage 17.

The variable frequency range gate generator 25 may take the form of a blocking oscillator circuit including an electron-discharge device such as a triode vacuum tube 45. To avoid loading the blocking oscillator tube 45, a cathode follower stage 46 may be interposed between the tube 45 and the output terminal 31.

The mixer 26 may take the form of a pentagrid converter having two separate control grids 47 and 48 connected or coupled to the input terminals 34 and 33, respectively. It will be understood that such a tube includes also the conventional shield grids, a suppressor grid, an anode 49 and a cathode 51.

The pulse amplifier 27, serving also as a voltage inverter, may take the form of a vacuum tube having a control grid 52 coupled to the anode 49 of the mixer tube 26 and having an anode 53 coupled to the rectifier 28. It will be understood that the tubes 26 and 27 are provided with conventional load resistors 54 and 55.

Preferably, the rectifier 28 is provided with an integrating load circuit comprising a load resistor 56 and a bypass condenser 57 connected to the frequency control terminal 32 of the variable frequency range gate generator 25.

A conventional power supply 58 represented by a battery of cells is provided for the tubes 26, 27, 45 and 46. As illustrated, the power supply 58 is provided with a positive terminal 59 and a grounded negative terminal, since the various tubes are also provided wih grounded connections. The gating amplifier 44 is likewise supplied by the source 58.

However, the intermediate frequency preamplifier 43 is energized through the tube 44, which is shown as a cathode follower having a cathode resistor 60, a control grid 61 connected to the range gate generator output terminal 31, and a cathode 62 connected to the cathode resistor 60 and also connected through resistors 63 and 64 in series with the anode 65 of the intermediate frequency preamplifier 43.

The blocking oscillator 45 may utilize a circuit including a pulse transformer 66 for regeneratively coupling the anode 67 of the tube 45 to its grid 68, a coupling condenser 69 interposed between a secondary winding 71 and a control grid 68, a throttling resistor 70 in series with the winding 71 and a conventional grid-leak resistor 72. As in conventional blocking oscillator circuits, the transformer 66 has a primary winding 73 connected in series with the positive terminal 59 of the power supply 58 and the tube anode 67.

The cathode follower tube 46 has a grid 74 coupled to a suitable point in the blocking oscillator circuit 25, for example, a point in its grid circuit, such as a terminal 75. It also has a cathode 76 connected to the range gate generator output terminal 31, a cathode resistor 77 being connected between the cathode 76 and the ground or negative connection of the power supply. For providing suitable negative bias for the grids of tubes 26 and 27, a suitable negative supply source or "C" battery 78 may be provided.

Before taking up the manner of operation of the system as a whole, the principle of operation of the blocking oscillator type range gate generator 25 may be considered. Whenever the grid 68 of the tube 45 rises to the cut-off potential, a surge of current passes through the tube, inducing a strong positive voltage in the winding 71 of the transformer 66, tending to drive the grid 68 further positive and thereby amplifying the surge of current that takes place. In so doing grid current is drawn, and the coupling condenser 69 is strongly charged negatively.

As soon as the potential of the anode 67 has fallen to the value at which no further increase in discharge current takes place, the voltage induced in the winding 71 falls to zero and the strong negative potential stored in the condenser 69 drives the grid 68 very sharply negative, cutting off the tube for a length of time, ordinarily considerably greater than the time duration of current conduction. The time required for the potential to rise to the cut-off value depends upon the time constants, determined primarily by the capacity of the condenser 69 and the resistance of the grid-leak 72. The time required depends also upon the potential to which the grid-leak resistor 72 is returned, namely the potential of the terminal 32. If this potential is relatively high, the condenser 69 is discharged more rapidly, that is, reaches the cut-off potential more rapidly, and the frequency of oscillation of the generator 25 is increased. On the other hand, if the terminal 32 is maintained at a relatively low potential, the discharge curve is not so steep, and the frequency of the generator 25 is decreased. It becomes apparent therefore that the voltage supplied to the terminal 32, through the rectifier 28, controls the frequency of the range gate generator 25.

The operation of the system as a whole is represented by the curves of Fig. 3. At instants determined by the frequency of the transmitter trigger generator 16, transmitter-triggering voltage pulses 81 are produced as represented by curve A of Fig. 3. The pulses 81 trigger the transmitter 11, each trigger giving rise to a train of oscillations, the envelope of which is represented as a rectangular pulse 82, shown in curve B of Fig. 3. Simultaneously, the wide gate generator 23 and the sweep wave circuit (not separately shown) within the indicator 13 are triggered. A "wide gate" voltage 83, curve C of Fig. 3, is produced by the generator 23, having a leading edge 84 occurring later than the transmitter pulse 82. The time sweep of the indicator 13 causes the cathode ray beam of the indicator 13 to sweep the screen 19, in the assumed case, horizontally. Whenever a reflection of the transmitter pulse 82 is received, as represented at 86 and 87, Fig. 3F, the receiver 12 would normally become responsive to produce corresponding vertical traces on the screen 19. However, owing to the use of the range gate 88 shown in curve D, the indicator 13 does not become responsive unless the reflection of the transmitted pulse is received during the range gate 88. The reflection 86 which occurs during the range gate 88 appears as the trace 22 on the screen 19, whereas the reflected pulses 85 and 87 are eliminated.

Whenever a pulse of current flows through the blocking oscillator tube 45, a square pulse of positive polarity appears on the output terminal 31 of the variable frequency range gate generator 25, and a similar pulse appears on the cathode 62 of the tube 44, as represented by the wave form 88 in Figs. 2 and 3. For the duration of the pulse 88, the positive terminal 59 of the power supply 58, is, in effect, connected to the anode 65 of the tube 43 through the anode load resistors 63 and 64. Accordingly, at this time, an input signal received through the tube 43 representing a reflection of a transmitted signal is supplied to the intermediate frequency stage 17 and energizes the video stage 18 and the indicator 13, shown in Fig. 1. In this manner the receiver 12 may be said to be gated by the gating voltage or pulse 88.

When the range gate 88 appears upon the terminal 31 of the range gate generator 25, a delayed pulse is transmitted through the delay line 29 to the grid 47 of the tube 26. For the sake of illustration and for convenience in the explanation, it is assumed that the constants of the apparatus have been so chosen that the range gate 88 is 5 microseconds wide, that is to say that the voltage remains positive for a time duration of 5 microseconds, and in this case the constants of the delay line 20 are so chosen as to provide a delay of about half this time, namely, substantially 2½ microseconds. The gate as it appears on the grid 47 is represented in Fig. 3E by the wave form 89. As represented in Fig. 3, the range gate 88 applied to the receiver and the delayed range gate 89 applied to the mixer 26 have an overlap of about 2½ microseconds.

As previously explained, the output terminal 41 of the receiver 12 is coupled to the other input or control grid 48 of the mixer tube 26. Accordingly, any signal such as the reflection 86, received by the receiver 12 during the 2½ microsecond period of overlap of the waves 88 and 89, energizing the grid 48 of the mixer 26, will cause the mixer 26 to become conducting and to depress the voltage of its anode 49 to produce a negative voltage pulse 91, Fig. 3G. This voltage is inverted by the tube 27 to form a positive pulse 92, Fig. 3H. The voltage pulse 92 is impressed on a differentiating circuit comprising a condenser 192 and a resistance 193 and the rapidly successive short steep positive and negative voltage pulses developed across the resistor as a result of each pulse 92 are applied through the rectifier 28 to the integrating condenser 57, charging it to a negative potential if the polarity of the rectifier 28 is as shown.

In this manner, whenever signals are received during the period of overlap of the range gates 88 and 89, negative potential is applied to the integrating condenser 57, the biasing potential of the frequency-control terminal 32 of the variable frequency range gate generator 25 is held low and the frequency of the generator 25 is maintained at a sufficiently reduced value for synchronization with reflected pulses 86. As shown in Fig. 3J, the condenser potential tends to follow a curve 93, drifting positive but periodically abruptly reduced by successive pulses. Each such pulse produces an abrupt decline 94, successive pulses cumulatively lowering the average potential from a level 95 to a limiting level 96 that depends upon amplitudes and durations of the pulses.

In the event that successive received signals tend to cause the frequency of the generator 25 to be too greatly reduced, the gates 88 and 89 will tend to be so delayed in time of occurrence with respect to the received signals that the received signal 86 tends to precede the leading edge of the delayed gate 89. Actually, however, the voltage across condenser 57 cannot become sufficient to reduce the frequency of the range gate and delayed gate to such an extent as to permit the received signal pulse 86 entirely to precede the delayed gate 89, because as this tends to occur, the coincidence of the received pulses 86 with the delayed gate 89 as well as with gate 88 tends to be reduced, and the mixer output tends to diminish, thus producing equilibrium and synchronization with the received pulses 86 substantially coincident with the leading edge of delayed gate 89. In this manner, the range gates 88 and 89 may be said to track the reflected pulse 86 in range. The partial overlapping of the gates 88 and 89 serves to make the tracking more precise. If there are other objects intercepting transmitted pulses causing reflected pulses 85 and 87, for example, these have no effect on the tracking for the reason that the receiver is gated or sensitive only for the time duration of the range gate 88.

In case the apparatus is set in operation when there is no object present to reflect pulses or in case the range gate is not synchronized with any reflected pulse when the apparatus is started, the apparatus will commence "searching" or "scanning" in range. This occurs because in the arrangement described the natural frequency of the range gate generator 25 when its terminal 32 is biased to ground potential (or the potential corresponding to zero charge on the condenser 57) is greater than the frequency of the trigger generator 16, which produces the transmitter trigger 81, which, in turn, gives rise to the transmitter pulse 82 as shown in Figs. 3A and 3B. As represented by the arrows 97 and 98 in Figs. 3D and 3E, the range gate 88 and the delayed gate 89 are not fixed in time of occurrence. They gradually shift to the left since their natural frequency is greater than the natural frequency or repetition rate of the trigger 81 and the transmitter pulse 82, and this shifting continues until the time of occurrence of a reflected pulse, such as the pulse 86, for example, coincides with the aforementioned 2½ microsecond overlap of the gates 88 and 89. At such a time the tracking operation previously described commences. Thereupon, the pulses 88 and 89 lock in step with the reflected pulse 86.

If the detected object moves toward or away from the observation station at which the apparatus is located, the range gates 88 and 89 move to the left or to the right, as represented by the arrows 97 and 98 to remain in step with the time of occurrence of the reflected pulse. It will be understood that the radio waves transmitted by the transmitter 11 and received by the receiver 12 travel at a finite velocity, and, therefore, the time delay between the time of occurrence of the transmitted pulse 82 and the time of occurrence of the reflected pulse 86 being tracked represents the distance or range to the detected object. Since the screen 19 of the indicator 13 may be calibrated in terms of time delay or range, the position of the trace 22 on the screen 19 represents the range of the object detected and once an object has been detected, the trace 22 remains upon the screen moving to the right or to the left in the event of variations in distance of the detected object.

If the range gate generator 25 has a natural frequency lower than the transmitter trigger generator 16, the rectifier 28 should be poled to supply positive voltage instead of negative to the frequency control terminal 32. Searching or scanning in range will then take place by shifting of the gates 88 and 89 to the right instead of toward the left until a "target" or object is located and the reflected pulse is framed by the gates 88 and 89. A reversing switch 90 may be provided for adopting the automatic tracking system to pulse transmitters having repetition rates either above or below the natural frequency of the blocking oscillator 25.

If desired, the apparatus may be manually set to track any desired object by providing a disconnect switch 99, which may be opened to prevent automatic tracking until the desired "target" has been "framed" by the range gate 88, whereupon the switch 99 may be closed to enable the apparatus to hold the gate on the target. For manually setting frequency or initially setting the potential of the frequency-control terminal 32 before the apparatus is set for automatic tracking, a potentiometer 101 may be provided. For placing the potentiometer in operation and simultaneously stopping automatic tracking, a changeover switch 102 may be provided, comprising a movable blade 103, connected to the condenser 57, a stationary contact 104 connected to the rectifier 28 and a secondary stationary contact 105 connected to the potentiometer 101.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. In a recurrent pulse radio object locator including a receiver, a range tracking system comprising in combination with the receiver, a variable frequency recurrent pulse range gate generator having a gate recurrence frequency control terminal, means coupling said range gate generator to said receiver for desensitizing said receiver during intervals between range gates produced by said generator, mixer means responsive to said generator and to said receiver for producing an output voltage varying in accordance with the coincidence of received signals with said range gates, and a coupling for energizing said frequency-control terminal by said mixer means.

2. In a radio object locator including a transmitter trigger generator and a receiver having a video output terminal and a gating input terminal, a range tracking system comprising in combination with said terminals, a range gate generator having a frequency normally greater than that of the trigger generator with a frequency-control terminal responsive to applied voltage for decreasing the frequency of the range gate generator, a mixer with input connections from the output terminal of the receiver and from the range gate generator, and a coupling between the mixer and the frequency control terminal of the range gate generator for applying a frequency reducing voltage to the range gate generator whenever the time of occurrence of a received signal coincides with the time of occurrence of a range gate produced by the range gate generator.

3. An object locating system comprising in combination, a transmitter adapted to project radio waves into space in which the presence of an object is suspected, a substantially fixed frequency trigger generator for pulsing said transmitter, a receiver responsive to any reflected radio waves, said receiver having a gate terminal and an output terminal, a variable frequency range gate generator having an output terminal upon which is formed a range gate voltage and having a frequency control terminal, the normal frequency of the range gate generator being different from that of the trigger generator, a mixer having an input terminal connected to the output terminal of the receiver, an input terminal coupled to the output terminal of the range gate generator and an output terminal coupled to the frequency control terminal of the range gate generator, the gating terminal of the receiver also being coupled to the output terminal of the range gate generator, whereby the receiver is sensitive only during the time duration of the range gate voltage supplied by the range gate generator, the mixer is energized only when the time of occurrence of a received signal coincides with the range gate voltage, and the frequency of the range gate generator is varied whenever said coincidence takes place in order to adjust the frequency of said range gate generator to that of the transmitter trigger generator.

4. In an object locating system including a transmitter trigger generator having a substantially fixed frequency and a receiver with a gating terminal and an output terminal, a range tracking system comprising a variable frequency range gate generator having a normal frequency different from that of the transmitter trigger generator and having a frequency control terminal and an output terminal, a mixer having a pair of input terminals and an output terminal, a coupling between the output range gate terminal and the receiver gating terminal, a coupling between the receiver output terminal and one of the mixer input terminals, a coupling between the range gate output terminal and the remaining input mixer terminal, and a coupling between the mixer output terminal and the frequency-control terminal of said range gate generator for varying the frequency of the range gate generator to conform to that of the trigger generator whenever coincidence takes place between the time of occurrence of a received signal and a version of the range gate voltage produced by the range gate generator.

5. Apparatus as in the preceding claim in which the coupling between the range gate generator and the mixer comprises a delay device, whereby said version of the range gate voltage is a delayed version.

6. Apparatus as in claim 4 in which the coupling between the mixer output terminal and the range gate generator comprises a rectifier, and the range gate generator is responsive in frequency to the magnitude of unidirectional voltage applied thereto.

7. Apparatus as in claim 4 in which the range gate generator comprises a blocking oscillator with a grid bias voltage supplied by the mixer.

8. Apparatus as in claim 4 in which the mixer comprises a pentagrid converter tube with control grids connected to the input terminals of the mixer, and with an anode coupled to the range gate generator for varying the potential of the frequency control terminal in response to coincidence of signals applied to the control grids of the mixer.

9. A range tracker comprising in combination, a recurrent pulse transmitter element and a recurrent pulse receiver gater element of normally different recurrence frequencies and means operatively coupled to one of said elements in recurrence frequency controlling relation for adjusting the recurrence frequency of said one element according to the time of signal reception to cause continuance of signal reception.

10. In combination with a pulse-reception receiver having a gating terminal, an adjustable frequency self-oscillating device for supplying gating voltage to the gating terminal, and means for adjusting the gating frequency of said self-oscillating device to conform to received-pulse frequency, said last named means being jointly responsive to said receiver and said self-oscillating device for varying the frequency of said self-oscillating device according to the time relations of the reception of pulses by said receiver and the production of gating voltage variations.

HORACE MYRL STEARNS.

REFERENCES CITED

The following references are of record in the file of this patent:

UNITED STATES PATENTS

| Number | Name | Date |
| --- | --- | --- |
| 2,270,773 | Sonnentag et al. | Jan. 20, 1942 |
| 2,283,523 | White | May 19, 1942 |
| 2,406,316 | Blumlein | Aug. 27, 1946 |
| 2,421,020 | Earp | May 27, 1947 |
| 2,422,074 | Bond | June 10, 1947 |
| 2,433,667 | Hollingsworth | Dec. 30, 1947 |

FOREIGN PATENTS

| Number | Country | Date |
| --- | --- | --- |
| 460,488 | Great Britain | Jan. 28, 1937 |